United States Patent [19]

Johnson

[11] Patent Number: 4,667,757
[45] Date of Patent: May 26, 1987

[54] SYSTEM FOR DETERMINING AXLE SPACING

[75] Inventor: Bernard A. Johnson, Deerfield, Ill.

[73] Assignee: Mangood Corporation, Grayslake, Ill.

[21] Appl. No.: 869,571

[22] Filed: Jun. 2, 1986

[51] Int. Cl.⁴ .................. G01G 19/40; G01G 19/04; G01B 5/14

[52] U.S. Cl. ......................... 177/1; 177/25; 177/163; 364/567; 33/125 R

[58] Field of Search .................. 177/1, 163, 25; 33/125 R; 364/567

[56] References Cited

U.S. PATENT DOCUMENTS

| | | | |
|---|---|---|---|
| 2,844,028 | 7/1958 | Benn | 177/1 X |
| 3,175,438 | 3/1965 | Johnson | 364/567 X |
| 3,216,515 | 11/1965 | Roberts | 177/25 |
| 3,284,619 | 11/1966 | Wentzel et al. | 364/567 |
| 3,319,053 | 5/1967 | Roberts | 364/567 X |
| 3,721,820 | 3/1973 | Caulier et al. | 177/163 X |
| 3,877,151 | 4/1975 | Roberts | 33/125 R X |
| 4,094,367 | 6/1978 | Jones et al. | 177/163 X |
| 4,258,809 | 3/1981 | Jones et al. | 177/163 X |

Primary Examiner—George H. Miller, Jr.
Attorney, Agent, or Firm—George H. Gerstman

[57] ABSTRACT

A system is disclosed for determining the spacing between axles of a vehicle which may be in motion, on the basis of weight alone. A weighbridge is provided with a first load cell spaced from a second load cell along the length of the weigh bridge by a distance L, with each load cell being responsive to the load on its respective location on the weighbridge. After a first axle is on the weighbridge, the weight on the first load cell and the weight on the second load cell are periodically sampled. The average stored weight M1 of the first axle is determined at the time that a second axle is about to enter the weighbridge. The instantaneous weight W2 on the second load cell is measured at the time that the second axle is about to enter the weighbridge. The distance $X_1$ between the first axle and the second axle is determined by calculating

W2L/M1

Distances between subsequent axles can also be determined in accordance with this invention. In another embodiment, after the first axle has entered the weighbridge at a time that a second axle is about to enter the weighbridge, the weight W1 on the first load cell and the weight W2 on the second load cell are measured and the distance between the first axle and the second axle is determined by calculating

W2L/(W1+W2).

10 Claims, 6 Drawing Figures

SYSTEM FOR DETERMINING AXLE SPACING

FIELD OF THE INVENTION

The present invention concerns a novel system for determining the spacing between axles of a vehicle which may be in motion.

BACKGROUND OF THE INVENTION

Government regulations place limits upon the weight of a cargo-bearing truck and often the regulations take into account the axle spacings. Typically trucks are required to drive onto weighbridges on which axle weights are determined. If a truck is moving at a constant speed, the axle spacings can be determined by sensing the axles as they pass over axle sensing means.

However, the speed of the truck may vary as it is moving over the axle sensors or the truck may stop during the length measurement. In prior art systems, if this should occur, the axle spacings cannot be determined accurately. Further, the weighbridges that are utilized for weighing trucks in motion are typically axle weighers and do not provide the weight accuracy that is provided when a truck is weighed in its static condition.

It is, therefore, an object of the present invention to provide a system for determining the spacing between axles of a vehicle without regard to the speed of the vehicle. The system of the present invention computes axle spacings on the basis of weight alone, thereby permitting trucks being weighed to stop without affecting the accuracy of the axle spacing measurements. On the other hand, by using a longer weigh bridge and enabling the trucks to move relatively slowly or stop during weighing, a more accurate weight determination can be made.

Further objects and advantages of the present invention will become apparent as the description proceeds.

SUMMARY OF THE INVENTION

In accordance with the present invention, a method is provided for determining the spacing between axles of a vehicle. A weighbridge is provided with a first load measuring means and a second load measuring means. The first and second load measuring means are spaced from each other along the length of the weighbridge by a distance L. Each load measuring means is responsive to the load on its respective location on the weighbridge.

The weight on the first load measuring means and the weight on the second load measuring means are periodically sampled and stored after a first axle is on the weighbridge. The average stored weight $M_1$ of the first axle is determined. The instantaneous weight $W_2$ on the second load measuring means is measured at the time that the second axle is about to enter the weighbridge. The distance $X_1$ between the first axle and the second axle is determined by calculating $$W_2 L / M_1$$

The distance between the second axle and a third axle can be determined by periodically sampling and storing the weight on the first load measuring means and the weight on the second load measuring means after the second axle is on the weighbridge. The average stored weight $M_2$ of the second axle is then determined. The instantaneous weight $W_2'$ on the second load measuring means is measured at the time that the third axle is about to enter the weighbridge. To determine the distance $X_2$ between the second axle and the third axle, a calculation is made to determine $$(L W_2' - X_1 M_1)/(M_1 + M_2)$$

In another embodiment of the invention, the distance between the first axle and the second axle is determined by measuring the weight $W_1$ on the first load measuring means and the weight $W_2$ on the second load measuring means after the first axle has entered the weighbridge and at a time that a second axle is about to enter the weighbridge. A calculation of $$W_2 L/(W_1 + W_2)$$

is then made to determine the distance between the first axle and the second axle.

A more detailed explanation of the invention is provided in the following description and claims, and is illustrated in the accompanying drawings.

DETAILED DESCRIPTION OF THE ILLUSTRATIVE EMBODIMENT

Figure 1:
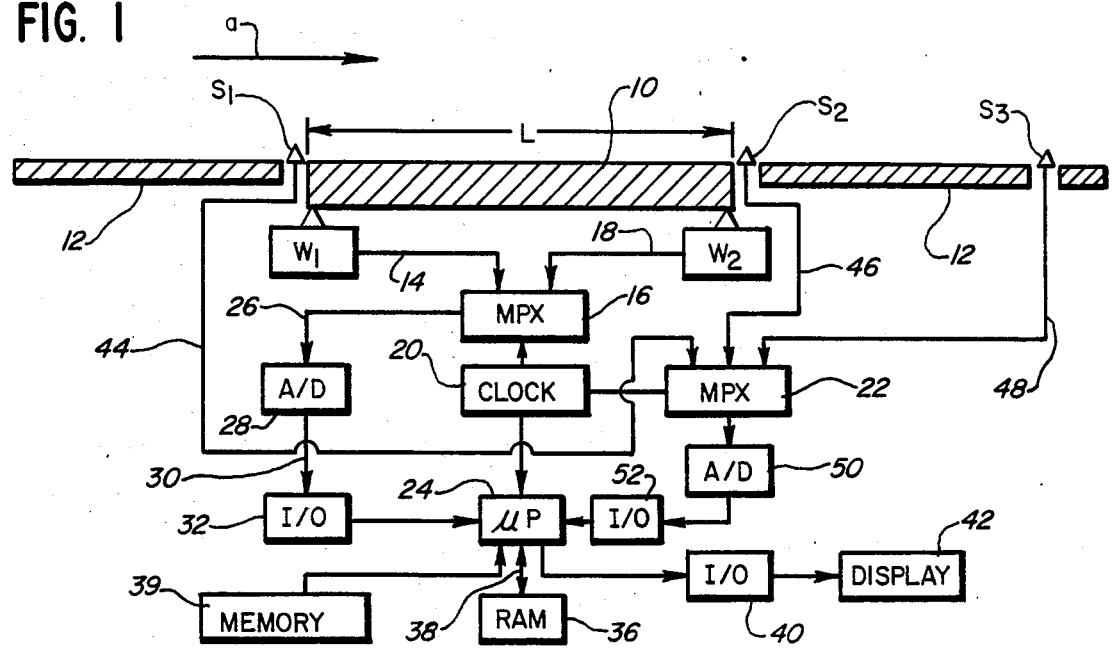
FIG. 1 is a block diagram of a system for determining the spacing between axles of a vehicle, constructed in accordance with the principles of the present invention.

Referring to FIG. 1, the novel system of the present invention is shown therein comprising a weighbridge 10 spaced between portions of roadway 12, thereby enabling the weighbridge 10 to move vertically in response to a load thereon. A first load cell pair $W_1$ is provided at the upstream end of weighbridge 10 and a second load cell pair $W_2$ is provided at the downstream end of weighbridge 10, with load cells $W_1$ and $W_2$ being spaced from each other by a distance L.

A first axle sensing switch S1 is provided at the upstream end of weighbridge 10, a second axle sensing switch S2 is provided at the downstream end of weighbridge 10, and a third axle sensing switch S3 is provided on roadway 12 downstream of the weighbridge 10. Sensing switches S1 and S2 may be *on* weighbridge 10 provided an appropriate offset is added to the spacing.

Load cell $W_1$ is responsive to the load at its weighbridge location and load cell $W_2$ is responsive to the load at its weighbridge location. A signal representing the load on load cell $W_1$ is provided via line 14 to multiplexer 16 and a signal corresponding to the load on load cell $W_2$ is provided via line 18 to multiplexer 16. Multiplexer 16 is clocked by means of a clock 20 which also provides clocking signals for multiplexer 22 and for microprocessor 24.

The multiplexed signals from lines 14 and 18 are fed via line 26 to an analog to digital converter 28 to which they are fed via line 30 to an input/output 32 of microprocessor 25. A program for microprocessor 24 is loaded into RAM 36 and microprocessor 24 is connected to the RAM 36 via line 38. The data is stored in bubble memory or hard disc 39. The output of microprocessor 24 is connected to input/output 40, the output of which is connected to a display device 42. Display device 42 could comprise a video terminal, a printer, or both.

The signal from first sensing switch S1 is fed via line 44 to multiplexer 22; the signal from second sensing switch S2 is fed via line 46 to multiplexer 22 and the signal from third sensing switch S3 is fed via line 48 to multiplexer 22. The multiplexed output of multiplexer 22 is fed to analog to digital converter 50, the output of which is fed to input/output 51 and from there to microprocessor 24. Microprocessor 24, controlled by the program stored in RAM 36 will provide a suitable output signal for display 42 in response to weigh signals provided to input/output 32 of microprocessor 24 and axle sensing signals provided to input/output 52 of microprocessor 24.

In the operation of the system according to the principal embodiment, a truck will approach the weighbridge 10 in the direction of arrow a. A first axle is detected by axle sensor S1 and a signal is provided on line 44. Since there is no other axle on the weighbridge 10, the system waits until the first axle leaves sensor S1 after which it is assumed that the first axle is on weighbridge 10. At this time the weights on load cell $W_1$ and load cell $W_2$ are sampled periodically (for example, every 0.001 second) and are stored in RAM 36.

Figure 2:
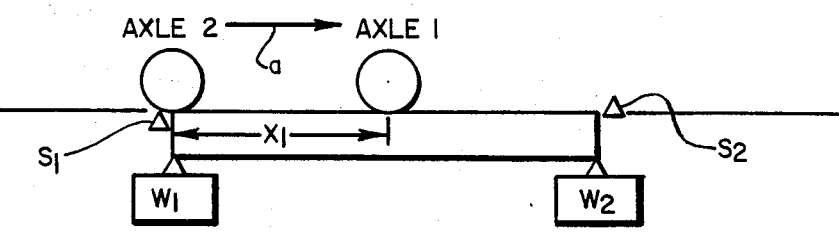
FIG. 2 is a diagrammatic view of the system when the vehicle is in position for a measurement of the distance $X_1$ between the first axle and the second axle.

Now referring to FIG. 2, it can be seen that a second axle has reached sensor S1 and is sensed by sensor S1. At this time, the instantaneous weight W1 on load cell $W_1$ is taken and stored and the instantaneous weight W2 on load cell $W_2$ is taken and stored.

At this time, the distance $X_1$ between axle 1 and axle 2 can be determined by multiplying the instantaneous weight W2 times length L and dividing the product against the sum of instantaneous weight W1 and instantaneous weight W2, i.e., $$W2L/(W1+W2)$$

On the other hand, the spacing distance $X_1$ can be determined by determining the average weight of axle 1 (by averaging the weights that have been stored prior to sensing of the second axle by sensor S1) to determine the average stored weight M1 of the first axle at or after the time that the second axle is about to enter the weighbridge. The spacing distance $X_1$ is then calculated by multiplying the instantaneous weight W2 times the length L and dividing the product by the average weight of axle 1 which is M1, i.e., $$W2L/M1$$

The spacing $X_1$ between axle 1 and axle 2 is then stored.

In actual practice, it may be most desirable to calculate the axle spacing distances after the vehicle has left the weighbridge. To this end, the data is stored in RAM 36 until the vehicle leaves weighbridge 10 and the calculations are made thereafter.

Figure 3:
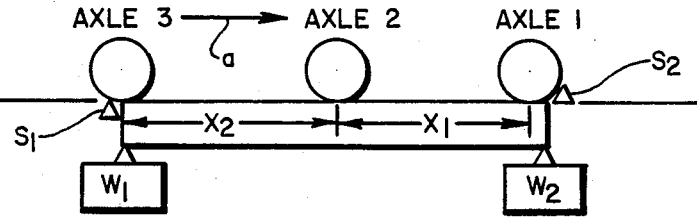
FIG. 3 is a diagrammatic view of the system when the truck is in position for determination of the distance $X_2$ between the second axle and the third axle.
Figure 4:
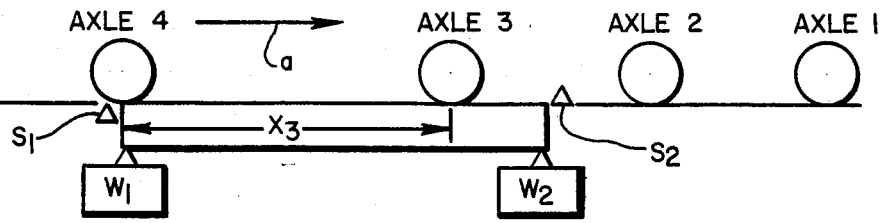
FIG. 4 is a diagrammatic view of the system when the truck is in position for determination of the distance $X_3$ between the third axle and the fourth axle.

Once axle 2 is on the weighbridge 10, the weight on first load cell $W_1$ and the weight on second load cell $W_2$ are periodically sampled and stored. Once the third axle has reached sensing switch S1, as illustrated in FIG. 3, the average stored weight M2 of the second axle will be determined at or after the time that the third axle is about to enter the weighbridge, and the average weight M2 is stored. At the time that the third axle is about to enter the weighbridge, the system takes another instantaneous sample weight W1' at load cell $W_1$ and instantaneous weight W2' at load cell $W_2$. The distance $X_2$ between the second axle and the third axle can now be determined by calculating $$(LW2'-X_1M1)/(M1+M2)$$

Once the third axle is on the weighbridge, the weight on load cell $W_1$ and the weight on load cell $W_2$ are periodically sampled and stored in RAM 36. At or after the time that the fourth axle is sensed by axle sensor S1, the average weight M3 of the third axle is determined and stored. At the time that the fourth axle is sensed by sensor S1, the instantaneous weight W1'' on load cell $W_1$ and the instantaneous weight W2'' on load cell $W_2$ are sampled and stored. The distance $X_3$ between axle 3 and axle 4 can then be determined by calculating $$\frac{LW2'' - M1(X_2+X_1) - M2 X_2}{M1 + M2 + M3}$$

The following table comprises a brief summary of the parameters and calculations which are used for determining the axle spacings:

Length between load cells $W_1$ and load cell $W_2$ = L

Average weight of axle 1 = M1

Average weight of axle 2 = M2

Average weight of axle 3 = M3

Distance between axle 1 and axle 2 = $X_1$

Distance between axle 2 and axle 3 = $X_2$

Distance between axle 3 and axle 4 = $X_3$ $$X_1 = \frac{W2L}{W1+W2} \text{ or } \frac{W2L}{M1}$$

$$X_2 = \frac{W2'L - X_1 M1}{M1+M2}$$

$$X_3 = \frac{W2''L - M1(X_1+X_2) - M2 X_2}{M1 + M2 + M3}$$

If the weighbridge 10 is not sufficiently long to hold the complete truck, the axles leaving the weighbridge must be monitored either by detecting weight reductions or by using axle sensor S2. The latter method is preferred since it is generally more accurate. When an axle reaches sensor S2, all subsequent weight sample recording is suspended until the axle leaves sensor S2 after which it is assumed to have left the weighbridge 10 and the weight sampling can continue as before. Sensor S2 can also be used to initiate a second set of spacing measurements from the downstream end of weighbridge 10. These can then be averaged with those from the upstream end of weighbridge 10 to obtain higher accuracy.

When all of the axles have left the weighbridge, the axle weights and spacings can be determined, based on the instantaneous end weights, the measured axle and axle group weights, the previously computed axle weights and spacings, and the known length of the weighbridge and position of the axle sensors relative to the weighbridge. Alternatively, these determinations can be made as each axle reaches the entrance of axle sensor S1 or leaves the exit axle sensor S2.

If the length of weighbridge 10 is shorter than the length of the longest axle spacing, one or more additional axle sensors are required either in front of the weighbridge or beyond it. Referring to FIG. 1, it is seen that axle sensor S3 is located downstream of weighbridge 10 and is preferably spaced from wheel sensor S2 by distance L.

The sensors that are downstream of the weighbridge 10 should be spaced at intervals no greater than the weighbridge length L and should extend the measurable spacing by the distance between the last sensor and the opposite end of the weighbridge. For example, if the weighbridge is a length L, the longest axle spacing it can measure is L. If an axle sensor S3 is placed at a distance L downstream of the bridge, the maximum spacing distance can be extended to 2L. Similarly, another sensor could be spaced at a distance L downstream of sensor S3, in order to measure a 3L spacing.

In order to enhance the operation of the system, inductive loops may be positioned in front of axle sensor S1 and beyond axle sensor S2, in order to inform the system when a vehicle is entering and leaving the scale. These inductive loops are coupled to loop detectors within the weighing instrument.

Figure 5A:
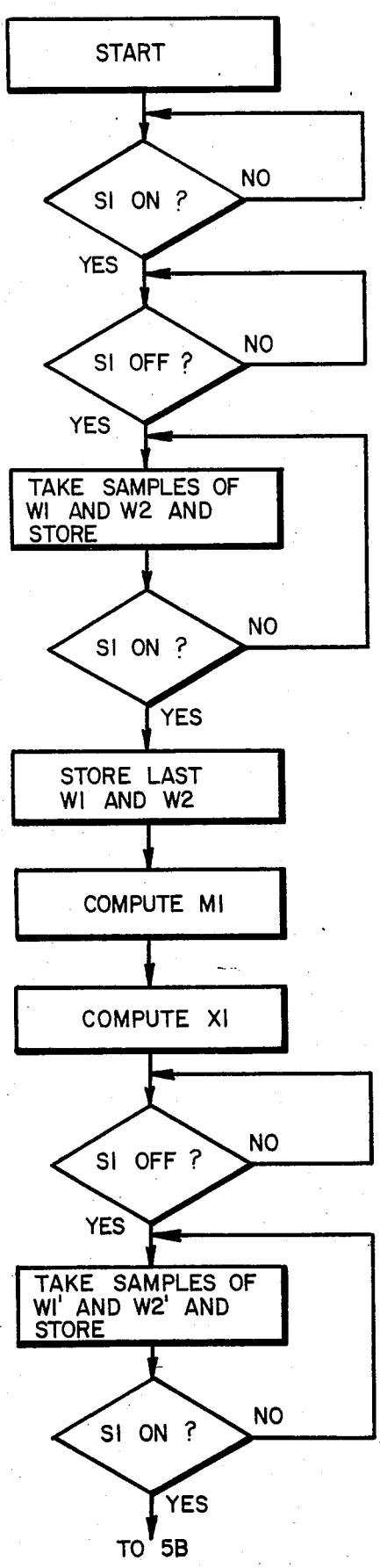
FIGS. 5A–5B, when connected together, comprise a flow chart of the system for determining the axle weights and the spacing between axles of the vehicle, as constructed in accordance with the principles of the present invention.
Figure 5B:
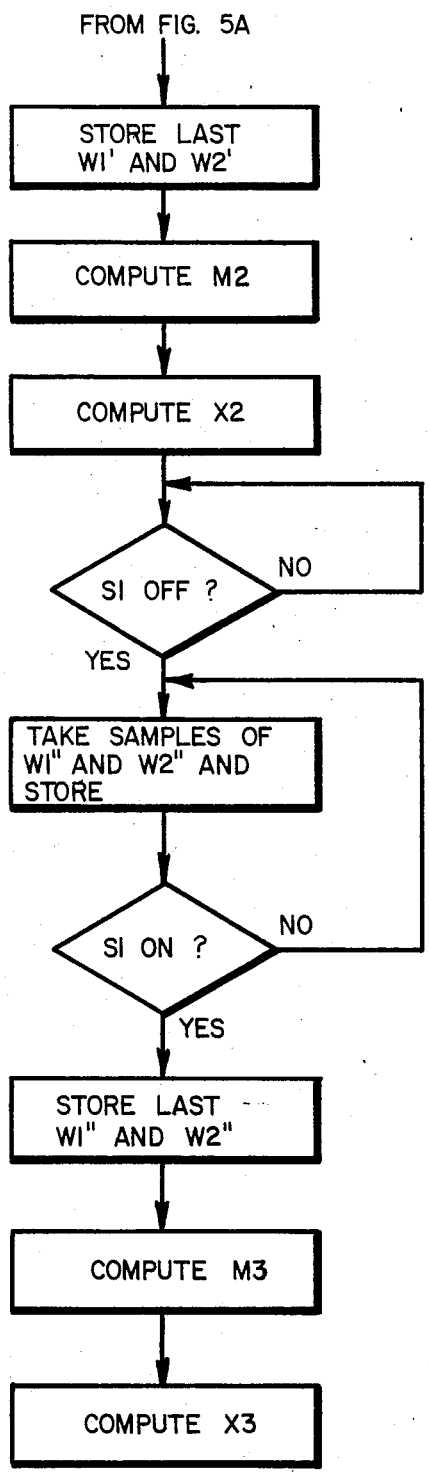

Referring now to FIGS. 5A-5B, a self-explanatory flow chart is illustrated therein showing the basic operation of the system of the present invention in connection with measuring the spacings between four axles.

As a result of the novelty of the system disclosed herein, axle spacings may be computed on the basis of weight alone. In this manner, trucks being weighed may stop when one or more of the axles is on the weighbridge, without affecting the accuracy of the spacing measurements.

Although an illustrative embodiment of the invention has been shown and described, it is to be understood that various modifications and substitutions may be made by those skilled in the art without departing from the novel spirit and scope of the present invention.

What is claimed is:

1. A method for determining the spacing between axles of a vehicle using a weighbridge with a first load measuring means and a second load measuring means, said first and second load measuring means being spaced from each other along the length of the weigh bridge by a distance L and with each load measuring means being responsive to the load on its respective location on the weigh bridge, comprising the steps of:

periodically sampling and storing the weight on said first load measuring means and the weight on said second load measuring means after a first axle is on the weighbridge;

determining the average stored weight $M1$ of the first axle;

measuring the instantaneous weight $W2$ on said second load measuring means at the time that the second axle is about to enter the weigh bridge; and calculating $$W2L/M1$$

to determine the distance $X_1$ between the first axle and the second axle.

2. A method as described in claim 1, including the steps of:

periodically sampling and storing the weight on said first load measuring means and the weight on said second load measuring means after the second axle is on the weighbridge;

determining the average stored weight $M2$ of the second axle;

measuriing the instantaneous weight $W2'$ on said second load measuring means at the time that the third axle is about to enter the weighbridge; and calculating $$(LW2''-X_1 M1)/(M1+M2)$$

to determine the distance $X2$ between the second axle and the third axle.

3. A method as described in claim 2, comprising the steps of:

periodically sampling and storing the weight on said first load measuring means and the weight on said second load measuring means after the third axle is on the weighbridge;

determining the average stored weight $M3$ of the third axle;

measuring the instantaneous weight $W2''$ on said second load measuring means at the time that the fourth axle is about to enter the weigh bridge; and calculating $$\frac{LW2'' - M1(X_2 + X_1) - M2(X_2)}{M1 + M2 + M3}$$

to determine the distance $X_3$ between the third axle and the fourth axle.

4. A method for determining the spacing between axles of a vehicle, which comprises the steps of:

providing a weighbridge with a first load measuring means and a second load measuring means;

spacing said first load measuring means and said second load measuring means from each other along the length of the weighbridge by a distance L, with each load means being responsive to the load on its respective location on the weighbridge;

providing means for sensing an axle adjacent the downstream end of the weighbridge;

sensing a first axle by said sensing means;

periodically sampling and storing the weight on said first load measuring means and the weight on said second load measuring means after said first axle is sensed by said sensing means;

determining the average stored weight $M1$ of the first axle;

measuring the instantaneous weight $W2$ on said second load measuring means at the time that said second axle is sensed by said sensing means; and calculating $$W2L/M1$$

to determine the distance $X_1$ between said first axle and the second axle.

5. A method as described in claim 4, including the steps of:

periodically sampling and storing the weight on said first load measuring means and the weight on said second load measuring means after a second axle is sensed by said sensing means;
determining the average stored weight M2 of the second axle;
measuring the instantaneous weight $W2'$ on said second load measuring means at the time that the third axle is sensed by the sensing means; and
calculating $$(LW2' - X_1 M1)/(M1 + M2)$$

to determine the distance $X_2$ between the second axle and the third axle.

6. A method as described in claim 5, including the steps of:
periodically sampling and storing the weight on said first load measuring means and the weight on said second load measuring means after the third axle is sensed by said sensing means;
determining the average stored weight M3 of the third axle;
measuring the instantaneous weight $W2''$ on said second load measuring means at the time that the fourth axle is sensed by said sensing means, and calculating $$\frac{LW_2'' - M1(X_2 + X_1) - M2X_2}{M1 + M2 + M3}$$

to determine the distance $X_3$ between the third axle and the fourth axle.

7. A method for determining the spacing between axles of a vehicle using a weigh bridge with the first load measuring means and a second load measuring means, said first and second load measuring means being spaced from each other along the length of the weighbridge by a distance L and with each load measuring means being responsive to the load on its respective location on the weigh bridge, comprising the steps of:
measuring the weight W1 on said first load measuring means and the weight W2 on said second load measuring means after a first axle has entered the weighbridge and at a time that a second axle is about to enter the weighbridge; and
calculating $$W2L/(W1+W2)$$

to determine the distance between the first axle and the second axle.

8. A method for determining the spacing between axles of a vehicle, which comprises the steps of:
providing a weighbridge with a first load measuring means and a second load measuring means;
spacing said first and second load measuring means from each other along the length of the weighbridge by a distance L, with each load measuring means being responsive to the load on its respective location on the weighbridge;
providing axle sensing means upstream of the weighbridge;
measuring the weight W1 on said first load measuring means and the weight W2 on said second load measuring means after a first axle has been sensed and entered the weighbridge and at a time that a second axle is sensed by said sensing means; and
calculating $$W2L/(W1+W2)$$

to determine the distance between the first axle and the second axle.

9. A system for determining the spacing between axles of a vehicle, which comprises:
a weighbridge with a first load measuring means and a second load measuring means, said first and second load measuring means being spaced from each other along the length of the weighbridge by a distance L and with each load measuring means being responsive to the load on its respective location on the weighbridge;
means for periodically sampling and storing the weight on said first load measuring means and the weight on said second load measuring means after a first axle is sensed by said first axle sensing means;
means for determining the average stored weight M1;
means for sampling and storing the weight W2 on said second load measuring means at the time the second axle is sensed by said axle sensing means; and
means for calculating $$W2L/M1$$

to determine the distance between said first axle and said second axle.

10. A system for determining the spacing between axles of a vehicle, which comprises:
a weighbridge with a first load measuring means and a second load measuring means, said first and second load measuring means being spaced from each other along the length of the weighbridge by a distance L with each load measuring means being responsive to the load on its respective location on the weighbridge;
axle sensing means for sensing an axle adjacent the upstream end of the weighbridge;
means for sampling and storing the weight W1 on said first load measuring means and the weight W2 on said second load measuring means after a first axle has been sensed by said axle sensing means and at a time that a second axle is sensed by said axle sensing means; and
means for calculating $$W2L/(W1+W2)$$

for determining the distance between the first axle and the second axle.

* * * * *